(12) United States Patent
Aloui et al.

(10) Patent No.: US 10,830,917 B2
(45) Date of Patent: Nov. 10, 2020

(54) METHOD FOR DETECTING AN ANOMALY IN THE CONTEXT OF USING A MAGNETIC LOCATING DEVICE (71) Applicants: COMMISSARIAT A L'ENERGIE ATOMIQUE ET AUX ENERGIES ALTERNATIVES, Paris (FR); MINMAXMEDICAL, La Tronche (FR)

(72) Inventors: Saifeddine Aloui, Fontaine (FR); Francois Bertrand, Seyssins (FR); Mickael Chave, Saint-Egreve (FR); Stephane Lavallee, Saint Martin D'Uriage (FR)

(73) Assignees: COMMISSARIAT A L'ENERGIE ATOMIQUE ET AUX ENERGIES ALTERNATIVES, Paris (FR); MINMAXMEDICAL, La Tronche (FR)

( * ) Notice: Subject to any disclaimer, the term of this patent is extended or adjusted under 35 U.S.C. 154(b) by 18 days.

(21) Appl. No.: 16/083,435

(22) PCT Filed: Mar. 9, 2017

(86) PCT No.: PCT/FR2017/050537
§ 371 (c)(1),
(2) Date: Sep. 7, 2018

(87) PCT Pub. No.: WO2017/153690
PCT Pub. Date: Sep. 14, 2017

(65) Prior Publication Data
US 2019/0086573 A1    Mar. 21, 2019

(30) Foreign Application Priority Data
Mar. 11, 2016    (FR) ...................................... 16 52053

(51) Int. Cl.
*G01V 3/08*    (2006.01)

(52) U.S. Cl.
CPC ..................................... *G01V 3/08* (2013.01)

(58) Field of Classification Search
CPC ....................................................... G01V 3/08
(Continued)

(56) References Cited

U.S. PATENT DOCUMENTS 7,321,228 B2    1/2008    Govari
2005/0246122 A1    11/2005    Jones, Jr. et al.
(Continued)

FOREIGN PATENT DOCUMENTS

FR    2 946 154 B1    12/2010
FR    2 951 280 B1    4/2011
(Continued)

OTHER PUBLICATIONS

International Search Report dated Apr. 25, 2017 in PCT/FR2017/050537 filed Mar. 9, 2017.
(Continued)

*Primary Examiner* — Farhana A Hoque
(74) *Attorney, Agent, or Firm* — Oblon, McClelland, Maier & Neustadt, L.L.P.

(57) ABSTRACT

A method for detecting an anomaly, associated with a magnetic locating device including a first magnetic element and a second magnetic element that are associated with a first object and with a second object, respectively. The first object includes a first movement sensor configured to determine a first datum dependent on inclination of the first object in a basic reference frame, or the terrestrial reference frame. The method includes: determining the first datum from the first movement sensor; determining a second datum dependent on inclination of the second object in the basic reference frame; determining at least one orientation parameter (Continued)

with the magnetic locating device using the first and second magnetic elements; using the at least one orientation parameter and the first and second data to generate an indicator of presence of the anomaly.

15 Claims, 2 Drawing Sheets

(58) Field of Classification Search
USPC .......................................... 324/326; 701/469
See application file for complete search history.

(56) References Cited

U.S. PATENT DOCUMENTS

2012/0092004 A1    4/2012  Billeres et al.
2015/0168153 A1*  6/2015  Hsu .......................... G01B 7/00
                                                                701/469

FOREIGN PATENT DOCUMENTS

| FR | 2 959 019 A1 | 10/2011 |
| WO | WO 2008/154183 A2 | 12/2008 |
| WO | WO 2010/136316 A2 | 12/2010 |
| WO | WO 2017/153690 A1 | 9/2017 |

OTHER PUBLICATIONS

Raab, F. H. et al., "Magnetic Position and Orientation Tracking System," IEEE Transactions on Aerospace and Electronic Systems, vol. AES-15, No. 5, Sep. 1979, pp. 709-718.

\* cited by examiner

METHOD FOR DETECTING AN ANOMALY IN THE CONTEXT OF USING A MAGNETIC LOCATING DEVICE

FIELD OF THE INVENTION

The invention relates to the field of magnetic locating devices.

PRIOR ART

A magnetic locating device generally comprises a magnetic emitter and a magnetic receiver. The magnetic receiver allows the magnetic field generated by the magnetic emitter to be measured in order to determine an orientation and/or a positioning of the magnetic emitter with respect to the reference frame given by the magnetic receiver.

Such a magnetic locating device gives a good precision, and may be used in high-tech applications in which this good precision is necessary.

However, the magnetic measurements may be perturbed when a perturbing body enters into the environment of the magnetic receiver. It results from such a perturbation that the location (orientation and/or position) loses in precision. In this respect, there is a need to know whether, yes or no, the location of an object is perturbed.

Document FR2946154 proposes a system for detecting perturbations using data relating to measured magnetic-field amplitudes to determine whether or not a perturber is present.

Document FR2951280 describes the use of directional vectors established from magnetic fields measured between magnetic sensors and a magnetic emitter and the comparison of these directional vectors with a view to signaling, where appropriate, the presence of a magnetic perturber.

All the aforementioned solutions use magnetic fields and electromagnetic technology to detect an anomaly, and are therefore dependent on the magnetic modality. Such solutions may be further improved.

OBJECT OF THE INVENTION

The object of the invention is an improved anomaly-detecting method. This improvement in particular proposes to not depend solely on magnetic location data to determine whether or not an anomaly is present.

We tend towards this object thanks to a method for detecting an anomaly associated with a magnetic locating device, said magnetic locating device comprising a first magnetic element and a second magnetic element that are associated with a first object and with a second object, respectively, the first object comprising a first movement sensor able to determine a first datum dependent on the inclination of the first object in a basic reference frame, notably the terrestrial reference frame, and this method comprises: a step of determining the first datum from said first movement sensor; a step of determining a second datum dependent on the inclination of the second object in said basic reference frame; a step of determining at least one orientation parameter with the magnetic locating device using the first and second magnetic elements; a step of using said at least one orientation parameter and the first and second data to generate an indicator of presence of the anomaly.

In particular, the magnetic locating device comprises at least one magnetic-field emitter, preferably formed by the first magnetic element, and at least one magnetic-field receiver.

Said anomaly may correspond to an inability of the magnetic locating device to deliver correct data on the relative location between the magnetic-field emitter and magnetic-field receiver.

The orientation parameter may describe the orientation of the first object or of the second object in the coordinate system of the magnetic locating device, in the sense that the orientation parameter may describe the relative orientation between the magnetic-field emitter and magnetic-field receiver of the magnetic locating device.

The first magnetic element and the second magnetic element may each be chosen from: a magnetic-field emitter and a magnetic-field receiver.

The first datum and the second datum may each be a terrestrial gravity vector, notably determined in a coordinate system associated with/attached to the first object and in a coordinate system associated with/attached to the second object, respectively.

The step of using said at least one orientation parameter and first and second data may comprise placing the first and second data in a common coordinate system using said at least one orientation parameter, said indicator of presence of the anomaly possibly being an angle made between the first datum and second datum placed in the common coordinate system.

According to one embodiment the step of using said at least one orientation parameter and the first and second data comprises: a transposition of the first datum, acquired in a coordinate system attached to the first object, to a coordinate system attached to the second object using said at least one orientation parameter; a generation of the indicator of presence of the anomaly from a comparison of the transposed first datum and the second datum; or: a transposition of the second datum, acquired in a coordinate system attached to the second object, to a coordinate system of the first object using said at least one orientation parameter; a generation of the indicator of presence of the anomaly from a comparison of the transposed second datum and the first datum.

Advantageously, said at least one orientation parameter is chosen from: an orientation quaternion between the second object and the first object, determined by the magnetic locating device, a rotation matrix allowing passage from the orientation of the first object to the second object and vice versa, and Euler or Cardan angles.

The second object may comprise a second movement sensor able to determine the second datum.

According to one particular implementation, the first magnetic element is a magnetic-field emitter, the second magnetic element is a magnetic-field receiver, and the indicator of presence of the anomaly is an angle $\theta$ such that:

$$\theta = \arccos\left(\frac{(q_{e \to r} * \vec{g}_r q_{e \to r}) \cdot \vec{g}_e}{\|\vec{g}_e\| \|\vec{g}_r\|}\right)$$

where $q_{e \to r}$ is the quaternion describing the orientation of the second object with respect to the first object, said quaternion being determined by the magnetic locating device from data measured by the magnetic-field receiver, $\vec{g}_e$ is a terrestrial gravity vector being determined by the first movement sensor, $\vec{g}_e$ is a terrestrial gravity vector determined by the second movement sensor or is a terrestrial gravity vector corresponding to the second datum, $q_{e \to r}*$ is the conjugated value of the quaternion $q_{e \to r}$, and the operator • is the scalar product.

Preferably, the first datum and the second datum representing terrestrial gravity vectors, the step of generating the indicator of presence of the anomaly is such that said indicator is an angle made between the transposed first datum and the second datum or between the first datum and the transposed second datum.

The method may furthermore comprise a step of comparing the indicator of presence of the anomaly with a predetermined threshold.

Notably, the first and second movement sensors are accelerometers.

The predetermined threshold may take into account all or some of the following elements: a resolution and a noise of each of the accelerometers, accelerations specific to each of the accelerometers, a bias of each of the accelerometers, sensitivity defects of each of the accelerometers and their thermal drifts, an orientation error of each of the accelerometers with respect to the magnetic locating device.

In one particular case, the first magnetic element of the first object is a magnetic-field emitter, and the second magnetic element of the second object is a magnetic-field receiver.

When the first movement sensor is an accelerometer, an acceleration may be determined from the first movement sensor and if this acceleration exceeds a maximum acceleration threshold, said indicator of presence of anomaly is considered to be erroneous.

The invention also relates to a method for using a system comprising a magnetic locating device equipped with a first magnetic element and with a second magnetic element that are associated with a first object and with a second object of said system, respectively, the first object comprises a first movement sensor able to determine a first datum dependent on the inclination of the first object in a basic reference frame, and the using method comprises a step of implementing the method for detecting an anomaly such as described. Preferably, when the first movement sensor measures an acceleration higher than a maximum acceleration threshold, the step of implementing the anomaly-detecting method is inhibited.

The invention also relates to a system comprising: a magnetic locating device equipped with a first magnetic element and with a second magnetic element, a first object comprising the first magnetic element, and a second object comprising the second magnetic element. Moreover, the first object comprises a movement sensor able to determine a first datum dependent on the inclination of the first object in a basic reference frame. In particular, the system comprises a module configured to implement the steps of the anomaly-detecting method such as described.

BRIEF DESCRIPTION OF THE FIGURES

The invention will be better understood on reading the following description, which is given by way of nonlimiting example and with reference to the drawings, in which.

In these figures, the same references have been used to refer to elements that are the same.

DESCRIPTION OF PARTICULAR EMBODIMENTS OF THE INVENTION

The method and system described below differ from the prior art notably in that they use one or more movement sensors that are able to measure data dependent on the inclination of an object, in particular a movable object, in order to detect an anomaly in the operation of the magnetic locating device. These movement sensors are preferably accelerometers.

In the present description, an "inclination" is preferably given with respect to a plane, notably that of the horizon when the basic reference frame is the terrestrial reference frame.

A magnetic locating device usually allows an object to be located with respect to another in a reference frame associated with one of the objects. To do this, the magnetic locating device may comprise at least one magnetic-field emitter and at least one magnetic-field receiver. The magnetic-field receiver is of course configured to measure the magnetic field emitted by the magnetic-field emitter with the aim of determining the orientation and/or the positioning of this magnetic-field emitter with respect to the magnetic-field receiver: this allows the orientation parameter described below to be determined. Below, the expression "magnetic element" is understood to mean either a magnetic-field receiver, or a magnetic-field emitter. The one or more magnetic-field emitters and the one or more magnetic-field receivers are each associated with one object. A magnetic-field receiver is also referred to as a magnetic receiver and a magnetic-field emitter is also referred to as a magnetic emitter. The expression "locate an object" is understood to mean that it is possible to determine the position of the object, which for example bears a magnetic emitter, and its orientation or its inclination with respect to another object, from magnetic data emitted by said magnetic-field emitter and measured by a magnetic-field receiver borne by said other object. In the present case, as will be seen below, an object may be fixed or movable. Magnetic locating devices are well known in the literature, in particular as in document "Magnetic Position and Orientation Tracking System" by Frederick H. Raab et al. published in IEEE Transactions on Aerospace and Electronic Systems, Vol. AES-15, No. 5 September 1979.

Moreover, in the present description, the use of the word "magnetic" may be replaced by the word "electromagnetic" in the sense that the source-magnetic emitter- may be in electromagnetic technology, and the magnetic receiver may also be in electromagnetic technology.

To determine at least a part of an orientation or an inclination of an object with respect to another, the objects notably have a front face and a back face, a vector normal to the front face possibly for example giving at least a part of the orientation or inclination of the object in question. This is mentioned by way of example insofar as the shape of the object is not necessarily constrained. For example, if the object is spherical, the vector may be randomly chosen. By orientation, what may be meant is an inclination of an object with respect to another or with respect to the basic reference frame.

In order to correctly locate an object using the locating device, it is necessary to detect any anomaly. An anomaly may be a poor calibration/adjustment of the locating device, or even the presence of a body that perturbs the magnetic field emitted by a magnetic-field emitter of the locating device or received by a magnetic-field receiver of the magnetic locating device.

Generally, an anomaly associated with the magnetic locating device, also called operating anomaly of the magnetic locating device, corresponds to an inability of the magnetic locating device to deliver correct location data. These location data are notably data on the relative location between the magnetic-field emitter and magnetic-field receiver. In this sense, when an anomaly is present, it induces errors in the estimation of the positioning of an object bearing a corresponding magnetic element, notably a movable object, that the magnetic locating device is able to provide.

Figure 1:
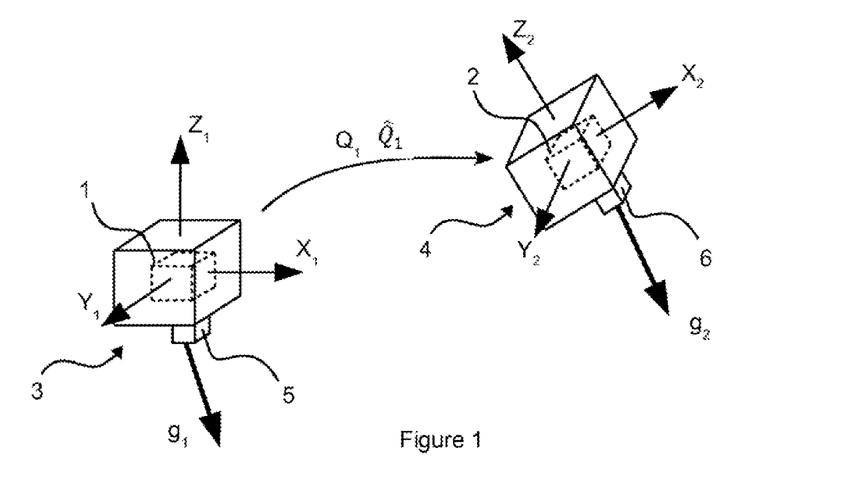
FIG. 1 illustrates the interaction between two objects of a system furthermore comprising a magnetic locating device and at least one movement sensor.
Figure 2:
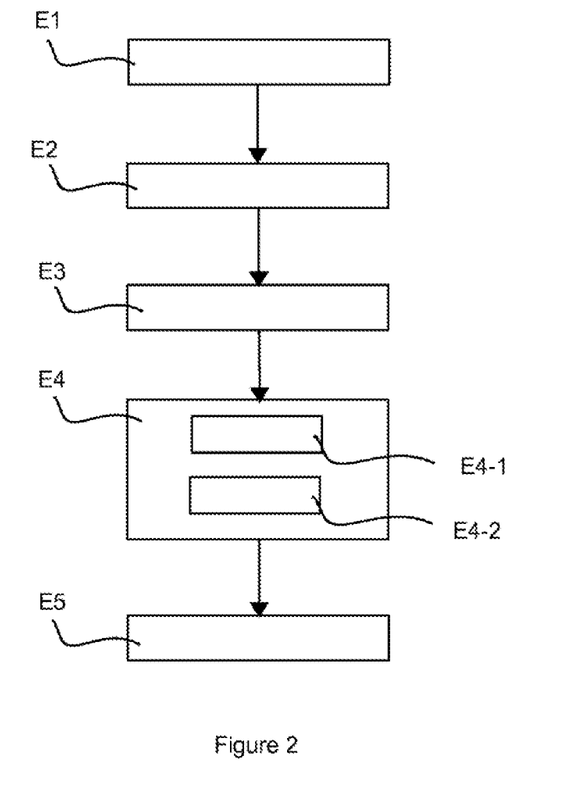
FIG. 2 illustrates various steps of a method for detecting an anomaly according to one particular embodiment of the invention, FIG. 3 schematically illustrates a particular diagram of implementation of the anomaly-detecting method.

As illustrated in FIGS. 1 and 2, the detecting method allows an anomaly associated with a magnetic locating device to be detected, the magnetic locating device notably comprising at least one magnetic-field emitter and at least one magnetic-field receiver. This magnetic locating device comprises a first magnetic element 1 and a second magnetic element 2 that are associated with a first object 3 and with a second object 4, respectively. In other words, the first object 3 comprises the first magnetic element 1, preferably forming the magnetic-field emitter of the magnetic locating device, and the second object 4 comprises the second magnetic element 2. The first magnetic element 1 and the second magnetic element 2 may each be chosen from: a magnetic-field emitter and a magnetic-field receiver. In particular, the first and second objects 3, 4 belong to a system, and are notably separate. The first object 3 furthermore comprises a first movement sensor 5 able to determine, for example by measurement, a first datum $g_1$ dependent on the inclination of the first object 3 in a basic reference frame, notably the terrestrial reference frame. In particular, this first datum may represent the, and more particularly be the or be a function of the, terrestrial gravity vector $g_1$ seen by the first movement sensor 5 in a coordinate system associated with the first object 3. The coordinate system associated with the first object 3 is illustrated by the axes $X_1$, $Y_1$, $Z_1$, it is preferably a question of an orthogonal coordinate system. This coordinate system associated with the first object 3 may notably be movable within the basic reference frame. It will thus be understood that the first movement sensor 5 may be an accelerometer, notably a tri-axis accelerometer, able to determine the terrestrial gravity vector perceived by the first object 3 in its coordinate system $X_1$, $Y_1$, $Z_1$. In other words, the first datum $g_1$ may be a set of parameters that are measured by the first movement sensor 5 and that are representative of the terrestrial gravity vector seen by said first movement sensor 5 in the coordinate system associated with the first object 3 (this coordinate system then being the measurement coordinate system of the first movement sensor 5). The first datum is said to be dependent on the inclination of the first object 3 in the basic reference frame because, depending on the inclination of the first object 3 in the basic reference frame, the first datum determined in the coordinate system of the first object 3 (notably the parameters of the movement sensor 5) will possibly differ. An accelerometer allows data that are homogenous to an acceleration, for example given in m/s² or in "g", to be delivered. In other words, more generally, the first datum $g_1$ may be quantified/coded in the coordinate system $X_1$, $Y_1$, $Z_1$ attached to the first object 3. More generally, the first movement sensor 5 is a sensor that is insensitive to the magnetic fields used by the magnetic locating device, in other words, it gives one or more measurements that are independent of the magnetic locating device. Moreover, the detecting method comprises: a step E1 of determining the first datum $g_1$ from said first movement sensor 5; a step E2 of determining a second datum $g_2$ dependent on the inclination of the second object 4 in said basic reference frame; a step E3 of determining at least one orientation parameter with the magnetic locating device using the first and second magnetic elements 1, 2; a step E4 of using said at least one orientation parameter and the first and second data $g_1$, $g_2$ to generate an indicator of presence of the anomaly.

Thus, the orientation parameter determined by the magnetic locating device may describe the relative orientation between the magnetic-field emitter, in particular forming the first magnetic element 1, and magnetic-field receiver of the magnetic locating device. This for example allows the relative orientation between the first object 3, if the first magnetic element 1 is the magnetic-field emitter, and second object 4, if the second magnetic element 2 is the magnetic-field receiver, to be determined.

In other words, the step E3 of determining said at least one orientation parameter with the magnetic locating device allows, for example, the orientation of the first magnetic element 1, and therefore of the first object 3, relatively to the magnetic-field receiver, which may be formed by the second magnetic element 2 or be borne by a third object, to be determined.

The step E4 of using said at least one orientation parameter and the first and second data $g_1$, $g_2$ to generate an indicator of presence of the anomaly allows the first and second data $g_1$, $g_2$, which are in particular determined in the coordinate system associated with the first object 3 and in the coordinate system associated with the second object 4, respectively, to be placed in a common coordinate system (this common coordinate system is notably that of the magnetic-field receiver of the magnetic locating device), using said at least one orientation parameter. As a result, in the case of presence of the anomaly, said at least one orientation parameter determined by the locating device is erroneous: the first and second data placed in the common coordinate system via the use of said at least one orientation parameter will therefore present a difference such that it will imply the detection of the presence of the anomaly. The common coordinate system may be an orthogonal coordinate system.

The first object 3 is preferably a movable object, i.e. it is able to move within the basic reference frame, in particular the terrestrial reference frame. In particular, when the first movement sensor 5 determines the first datum, the first object 3 is quasi-static or in movement in the basic reference frame. In fact, in case of use of accelerometers, in order to measure coherent data, the specific accelerations perpendicular to the terrestrial gravity vector must be low, and in general a low-pass filter is used in order to limit these effects.

The second datum $g_2$ may also represent a, and more particularly be a or be a function of a, terrestrial gravity vector defined in the coordinate system $X_2$, $Y_2$, $Z_2$, i.e. the coordinate system attached to the second object 4. This coordinate system $X_2$, $Y_2$, $Z_2$ may be an orthogonal coordinate system. This second datum $g_2$ may be set if the second object 4 is fixed in the basic reference frame, or determined for example by measurement (notably if the second object is fixed or movable). In this sense, the second object 4 may comprise a second movement sensor 6 able to determine, for example by measurement, the second datum $g_2$. This second movement sensor 6 may be of the same type as the first movement sensor 5 insofar as the second datum may be a set of parameters that are measured by the second movement sensor 6 and that are representative of the terrestrial gravity vector seen by said second movement sensor 6 in the coordinate system associated with the second object 4 (this coordinate system then being the measurement coordinate system of the second movement sensor 6). The second datum $g_2$ is said to be dependent on the inclination of the second object 4 in the basic reference frame because, depending on the inclination of the second object 4 in the basic reference frame, the determined second datum (notably the parameters of the movement sensor 6) may be different. More generally, the second movement sensor 6 is a sensor that is insensitive to the magnetic fields used by the magnetic locating device, in other words, it gives one or more measurements that are independent of the magnetic locating device. It will be understood that the determining step E2 may then be a step of determining the second datum $g_2$ from said second movement sensor 6.

According to one implementation (FIG. 1) stemming from what was described above, the second object 4 is fixed in said basic reference frame, notably the terrestrial frame of reference. Thus, the second datum $g_2$ may be determined once during the installation of the second object 4, for example using a spirit level to deduce therefrom the inclination of the second object 4, and therefore where appropriate the associated terrestrial gravitation vector $g_2$. Alternatively, and whether the second object 4 is fixed or movable, the second object 4 may comprise the second movement sensor 6 able to determine the second datum $g_2$ dependent on the inclination of the second object 4 in said basic reference frame, notably the terrestrial reference frame. This second movement sensor 6 may be of identical type to the first movement sensor 5 and as a result the data measured/determined by the first and second movement sensors 5, 6 are identical if the first and second objects 3, 5 are placed in the same location (in this case the positioning and orientation are the same), or at least according to the same orientation. In particular, when the second movement sensor 6 determines the second datum, the second object 4 is quasi-static or in movement in the basic reference frame.

It will be understood that, because the first and second data $g_1$, $g_2$ are dependent on the inclinations of the first object 3 and of the second object 4 defined in the same basic reference frame, notably the terrestrial reference frame, that these data point toward the same information (notably the same point) in the basic reference frame. In particular, when these first and second data $g_1$, $g_2$ are terrestrial gravity vectors, the latter point in the same direction whatever the position of the first object 3 with respect to the position of the second object 4. In the context of implementation of the present anomaly-detecting method, the separating distances between the objects (notably the first and second objects 3, 4) are preferably such that the first datum representative of the terrestrial gravity vector seen by the first object 3 in the coordinate system associated with the first object 3 (i.e. determined by the first movement sensor 5) and the second datum representative of the terrestrial gravity vector seen by the second object 4 in the coordinate system associated with the second object 4 (i.e. where appropriate determined by the second movement sensor 6) have directions that are considered to be coincident in the basic reference frame.

Notably, the detecting method may comprise a step E5 of comparing the indicator of presence of the anomaly with a predetermined threshold. If the presence indicator is higher than the predetermined threshold, then the anomaly is considered to be detected.

It will be understood from what has been said above that the present invention notably proposes to use, in addition to the magnetic locating device, an inertial device, notably based on one or more accelerometers, to verify whether the magnetic locating device is in anomaly or not. The inertial device is not perturbed by the field lines of a magnetic field. In other words, the first movement sensor 5, and where appropriate the second movement sensor 6, are distinct from the magnetic locating device, notably in the sense that the data measured/determined by the first movement sensor 5, and where appropriate the second movement sensor 6, are not perturbed by the magnetic fields.

It will be understood from what was described above that the first and second data $g_1$, $g_2$ may be compared by virtue of the use of the orientation information determined using the locating device. Notably, according to one particular implementation, it is possible to transpose the first datum $g_1$, acquired in the coordinate system of the first object 3, to the coordinate system of the second object 4 depending on said at least one orientation parameter or vice versa. In other words, it is possible to use the orientation parameter to virtually place/reorient the first object 3 with an orientation identical to that of the second object 4, this resulting in the measurement/determination carried out by the first movement sensor 5 also being modified depending on the virtual reorientation, and is called transposed first datum. In the perfect case, without any anomaly affecting the magnetic locating device, the transposed first datum is must be identical, or substantially identical notwithstanding a tolerance, to the second datum. In other words, the step E4 of using said at least one orientation parameter and the first and second data $g_1$, $g_2$ comprises: a transposition E4-1 of the first datum $g_1$, acquired (i.e. the datum determined by the first movement sensor 5) in a coordinate system $X_1Y_1Z_1$ attached to the first object 3, to a coordinate system $X_2Y_2Z_2$ attached to the second object 4 using said at least one orientation parameter; and a generation E4-2 of the indicator of presence of the anomaly from a comparison of the transposed first datum $g_1$ and the second datum $g_2$; or alternatively a transposition E4-1 of the second datum $g_2$, acquired (i.e. the datum determined by the second movement sensor 6) in a coordinate system attached to the second object 4, to a coordinate system of the first object 3 using said at least one orientation parameter and a generation E4-2 of the indicator of presence of the anomaly from a comparison of the transposed second datum and the first datum. More generally, the using step E4 comprises placing the first and second data $g_1$, $g_2$ in a common coordinate system using said at least one orientation parameter. Preferably, after this placement in the common coordinate system, the indicator of presence of the anomaly may be an angle made between the first and second data $g_1$, $g_2$ placed in the common coordinate system.

More particularly, said at least one orientation parameter is an orientation quaternion $\hat{Q}_1$ (FIG. 1) between the second object 4 and the first object 3 determined by the magnetic locating device. An orientation quaternion between two objects makes it possible to determine how to pass from the orientation of the first object 3 to the orientation of the second object 4 and vice versa. In particular, the orientation quaternion is a unit orientation quaternion that represents rotation-type transformations and which may be inverted. In the present description, any reference to an orientation quaternion may be replaced by a unit quaternion. A unit quaternion is a quaternion that may represent a rotation. Alternatively, said at least one orientation parameter may be a rotation matrix making it possible to pass from the orientation of the first object 3 to the second object 4 and vice versa, or Euler or Cardan angles. Quaternions are preferred because they do not have ambiguous points and they are represented by a four dimensional vector instead of a three by three matrix in the case of the rotation matrix. The orientation quaternion $\hat{Q}_1$ may be determined between a magnetic emitter and a magnetic receiver in order to determine the relative orientation between said magnetic emitter (therefore the first object 3 in the example in which the latter comprises the magnetic emitter) and said magnetic receiver (therefore the second object in the example in which the latter comprises the magnetic receiver). Knowing the orientation quaternion between the first object and another object (where appropriate said other object being the second object), it is possible to apply the orientation quaternion to the values measured/determined by the 5 first movement sensor 5 of the first object 3 so as to know the corresponding values placed in the coordinate system of the second object 4. In other words, returning to the example of FIG. 1, $g_1$ and $g_2$ each represent the terrestrial gravity vector represented in the basic reference frame: they are collinear. In the coordinate system attached to the first object 3, the first datum $g_1$ is determined by the first movement sensor 5 and in the coordinate system attached to the second object 4, the second datum $g_2$ is, where appropriate, determined by the second movement sensor 6. With $Q_1$ the quaternion that makes it possible to pass from the actual position of the first object 3 to the actual position of the second object 4, the application of this quaternion to $g_1$ allows $g_2$ to be found exactly. In the present case of anomaly detection, the determined quaternion is denoted $\hat{Q}_1$ because it is a question of an estimation/measurement carried out by the magnetic locating device. By applying $\hat{Q}_1$ to $g_1$, $\hat{g}_1$ is obtained, which corresponds to the first datum $g_1$ transposed to the coordinate system of the second object 4. If $g_2 = \hat{g}_1$ or if $g_2$ and $\hat{g}_1$ are close (i.e. their comparison is less than a predetermined threshold) then there is considered to be no anomaly whereas otherwise there is considered to be an anomaly and therefore an error in the determination of the quaternion by the magnetic locating device. This reasoning is also valid with respect to transposing the second datum $g_2$ to the measurement coordinate system of the first datum $g_1$.

It will be understood from what has been said above that the orientation parameter determined by the magnetic locating device is such that it allows one of the first and second data $g_1$, $g_2$ to be transposed to a comparison coordinate system, also called the common coordinate system, in which the first and second data $g_1$, $g_2$ are intended to be compared. This comparison coordinate system may be the coordinate system attached to the first object 3, or the coordinate system attached to the second object 4: in this case, a single orientation parameter established from the first and second magnetic elements 1, 2 may be used. Alternatively, the comparison coordinate system may be the coordinate system of a third object distinct from the first and second objects 3, 4: in this case two orientation parameters are established by the magnetic locating device using the first and second magnetic elements 1, 2, this alternative will be described in more detail below.

More particularly, the set of the quaternions H is a unital associative algebra over the field of the real numbers R. It is a set that resembles the set of complex numbers, except that there is one real dimension and three imaginary dimensions described by i, j, k, with $i_2 = j^2 = k^2 = ijk = -1$. Numbers of this kind are referred to as "hypercomplex numbers". Typically, a subset of the quaternions called the unit quaternions may describe rotations in a three-dimensional space. A rotation of an angle a about an axis of direction vector $\vec{u}$ is described by the quaternion q where:

$$q = \cos(\alpha) + \sin(\alpha)u_x i + \sin(\alpha)u_y j + \sin(\alpha)u_z k = \begin{bmatrix} \cos(\alpha) \\ \sin(\alpha)u_x \\ \sin(\alpha)u_y \\ \sin(\alpha)u_z \end{bmatrix}.$$

It will be noted that only unit quaternions (i.e. $\|q\|=1$ represent rotations). It will also be noted that the inverse rotation is none other than the rotation of angle $-\alpha$ about the axis directed by the vector $\vec{u}$ or the rotation of angle a about the axis directed by the vector $-\vec{u}$. In both cases, the inverse is the quaternion:

$$q^{-1} = \begin{bmatrix} \cos(\alpha) \\ -\sin(\alpha)u_x \\ -\sin(\alpha)u_y \\ -\sin(\alpha)u_z \end{bmatrix} = \bar{q} \text{ called the conjugate quaternion}$$

According to one preferred example embodiment, the first magnetic element 1 of the first object 3 is a magnetic-field emitter, and the second magnetic 2 of the second object 4 is a magnetic-field receiver. In this case, said at least one orientation parameter may be determined by the magnetic locating device from data measured by the magnetic-field receiver. It will thus be understood that here the orientation parameter allows the relative orientation between the magnetic-field emitter and the magnetic-field receiver, and therefore the relative orientation between the first and second objects 3, 4, to be determined.

In the case where the first datum $g_1$ and the second datum $g_2$ represent or are terrestrial gravity vectors, the step E4-2 of generating the indicator of presence of the anomaly is such that said indicator is an angle made between the transposed first datum and the second datum, or where appropriate between the first datum and the transposed second datum. More generally, said indicator is said to be an angle made between the first datum and the second datum placed in the same coordinate system, i.e. the aforementioned common coordinate system.

Figure 3:
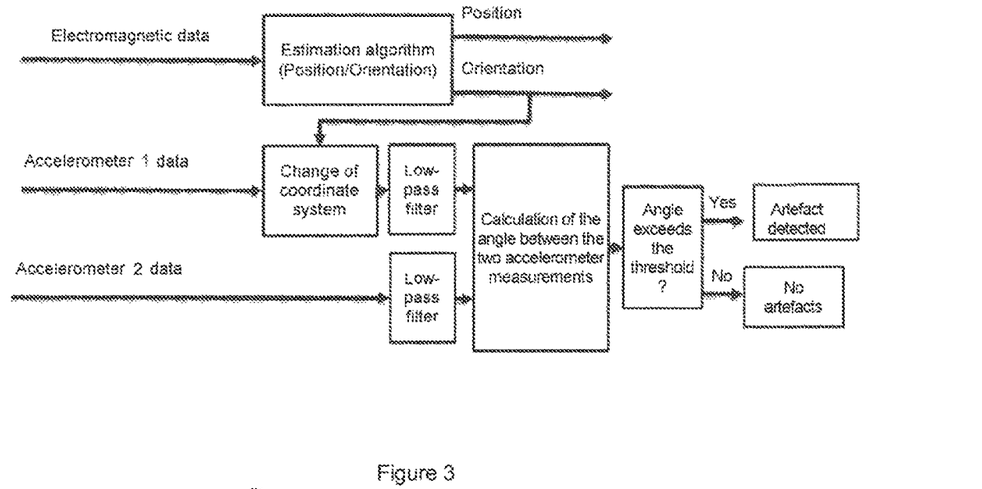

FIG. 3 illustrates a particular algorithm associated with the system illustrated in FIG. 1, in which system the first object 3 and/or the second object 4 are movable. The electromagnetic data generated by the magnetic locating device and the inertial data generated by the first and second movement sensors 5, 6 are synchronized such that at each sampling time the magnetic locating device returns a measurement of the magnetic field between the first object comprising the magnetic-field emitter and the second object comprising the magnetic-field receiver. This measurement of "Electromagnetic data" is then used to determine the "position" and "orientation" of the magnetic-field receiver (the second object 4 in the example) with respect to the magnetic-field emitter (the first object 3 in the example) using the function "Estimation algorithm". At the same time, each of the two accelerometers (the first and second movement sensors 5, 6) provide a measurement of the terrestrial gravity vector in the local coordinate system associated with the object bearing it: "Accelerometer 1 data" for the first movement sensor 5 and "Accelerometer 2 data" for the second movement sensor 6. The orientation estimated by the magnetic locating device is used to place the two measurements provided by the accelerometers in the same coordinate system (either the coordinate system attached to the emitter and therefore to the first object 3, or the coordinate system attached to the receiver and therefore to the second object 4) using the function "Change of coordinate system". These measurements are filtered (function "Low-pass filter") in order to remove the effect of accelerations specific to the accelerometers, for example using a low-pass filter. The angle separating the two terrestrial gravity vectors seen in the same coordinate system is calculated (function "Calculation of the angle between the two accelerometer measurements") and compared to a threshold (function "Angle exceeds the threshold?"). If the value of this angle is higher than the threshold then the magnetic locating device was unable to correctly estimate the orientation, this probably being because of an artefact external to the magnetic locating device, or of a malfunction of the magnetic locating device, in the contrary case, the locating device is considered to be operational and functional: i.e. to have provided results that are acceptable with respect to the desired precision.

Generally, it will be understood that the indicator of presence of the anomaly may be established using the first and second data and the orientation parameter that are determined at the same instant in time or in a restricted time range representative of a configuration of the system.

Figure 4:
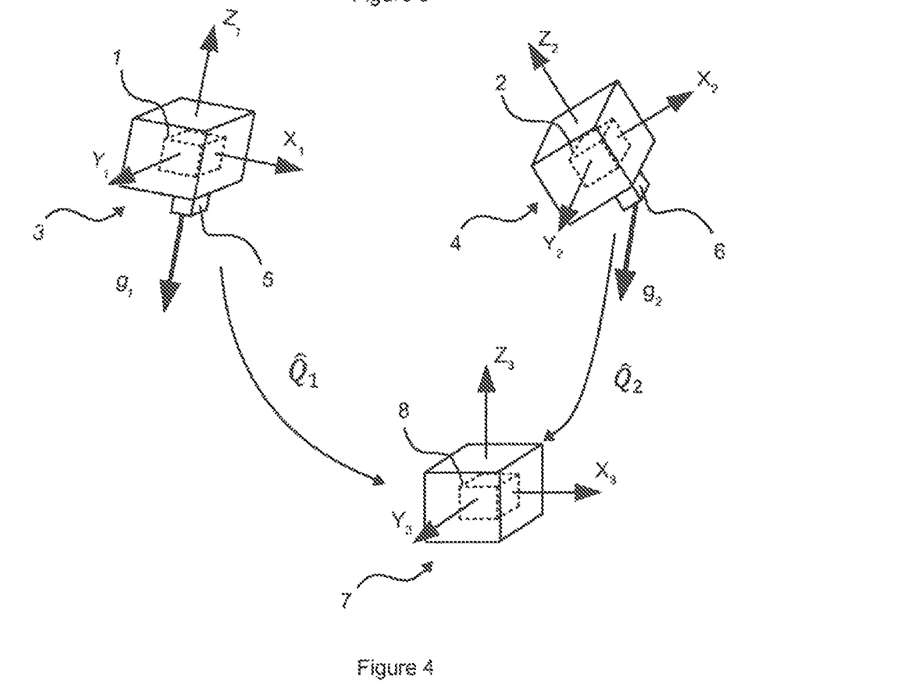
FIG. 4 illustrates another embodiment showing the interaction between three objects of a system furthermore comprising a magnetic locating device and two movement sensors.

According to another example illustrated in FIG. 4, the first object 3 and the second object 4 are both movable and each comprise a magnetic-field emitter 1, 2, and a movement sensor 5, 6 able to determine/measure a datum $g_1$, $g_2$ where appropriate dependent on the inclination of the first object 3 in the basic reference frame or dependent on the inclination of the second object 4 in the basic reference frame. A third object 7 may then comprise a magnetic-field receiver 8 of the magnetic locating device, and is associated with the basic reference frame (the third object 7 is notably fixed in the basic reference frame). Thus, the magnetic-field receiver 8 is capable of determining a first orientation quaternion $\hat{Q}_1$ between the first object 3 and the third object 7, and a second orientation quaternion $\hat{Q}_2$ between the second object 4 and the third object 7. The first orientation quaternion $\hat{Q}_1$ then allows, via a change of coordinate system, the values measured by the first movement sensor 5 of the first object 3 to be placed in the coordinate system $X_3Y_3Z_3$ attached to the third object 7, and the second orientation quaternion $\hat{Q}_2$ allows, via a change of coordinate system, the values measured by the second movement sensor 6 of the second object 4 to be placed in the coordinate system attached to the third object 7. Thus, the first and second data $g_1$, $g_2$ are comparable in the coordinate system attached to the third object 7, and if they are too different it is concluded that there is an anomaly at the level of the locating device. The coordinate system $X_3Y_3Z_3$ may be an orthogonal coordinate system. According to this example, the determining step E3 allows two orientation parameters to be determined using the first and second magnetic elements 1, 2 (which are then magnetic-field emitters): a first orientation parameter (the first quaternion) is determined using the magnetic receiver 8 and the first magnetic element 1, and a second orientation parameter (the second quaternion) is determined using the magnetic receiver 8 and the second magnetic element 2. In this respect, the using step E4 may use two orientation parameters and the first and second data to:

transpose the first datum $g_1$, acquired in the coordinate system $X_1Y_1Z_1$ attached to the first object 3, to the coordinate system attached to the third object 7, transpose the second datum $g_2$, acquired in the coordinate system $X_2Y_2Z_2$ attached to the second object 4, to the coordinate system attached to the third object 7, generate the indicator of presence of the anomaly from the comparison of the transposed first and second data.

According to yet another example that is an alternative to the example just given above, the third object 7 comprises a magnetic receiver, the first object 3 comprises a magnetic emitter and the second object 4 comprises a magnetc receiver. In this case, it is possible to detect an anomaly that only influence a part of the locating device in the sense that if an anomaly, such as a magnetic perturber, is located between the third object 7 and the first object 3 and does not influence the magnetic field between the first object 3 and the second object 4 it is possible to more specifically detect the source of the problem by locating it.

It will be understood from what has been said above that various implementations are possible, in which, notably:

the first object 3 is movable, the first magnetic element 1 is a magnetic-field receiver, the second object 4 is for example fixed, the second magnetic element 2 is a magnetic-field emitter, in this case the second object 4 has no need for a movement sensor. Moreover, in this case, there may be a plurality of identical and independent first objects.

the first object 3 is movable, the first magnetic element 1 is a magnetic-field emitter, and the second (fixed for example) magnetic element 2 is a magnetic-field receiver. Moreover, in this case, there may be a plurality of identical and independent second objects.

In fact, only at least one of the objects need be movable, the others possibly being movable or fixed.

Various implementations have been described above, but it will be understood that those skilled in the art will be able to apply the principles of the present invention to implement other embodiments involving other magnetic receivers and magnetic emitters placed on other objects of the plurality of objects different from the first, second, and where appropriate third, objects.

In the particular example in which the first magnetic element 1 is a magnetic-field emitter and the second magnetic element 2 is a magnetic-field receiver, the angle θ that it is sought to determine as indicator of presence of the anomaly and made between the first datum $g_1$ (here denoted $\vec{g}_e$) and the second datum $g_2$ (here denoted $\vec{g}_r$), notable in the common coordinate system is calculated as follows:

$$\theta = \mathrm{acos}\left(\frac{(q_{e \to r} * \vec{g}_r q_{e \to r}) \cdot \vec{g}_e}{\|\vec{g}_e\| \|\vec{g}_r\|}\right)$$

where $q_{e \to r}$ is the quaternion describing the orientation, i.e. forming said at least one orientation parameter, of the magnetic-field receiver (and therefore of the second object 4) with respect to the magnetic-field emitter (and therefore with respect to the first object 3), this quaternion being determined by the magnetic locating device from data measured by the magnetic-field receiver (these measured data notably correspond to determining how the magnetic-field receiver perceives the magnetic field emitted by the magnetic-field emitter, more particularly, the quaternion is obtained by virtue of the estimation based on the measurement of the magnetic field emitted by the magnetic emitter and measured by the magnetic receiver because there is a relationship between the value of this measured field and the position/orientation of the receiver with respect to the emitter: therefore, in case of presence of a magnetic perturber, the measured magnetic field is erroneous and the orientation estimation is distorted), $\vec{g}_e$ is the terrestrial gravity vector determined/measured by the first movement sensor 5 placed on the first object 3, $\vec{g}_r$ is the terrestrial gravity vector determined/measured by the second movement sensor 6 placed on the second object 4, $q_{e \to r}^*$ is the conjugated value of the quaternion $q_{e \to r}$, and the operator • is the scalar product. Alternatively, when the second movement sensor is not present because the second object is fixed with respect to the basic reference frame, $\vec{g}_r$ may simply be determined by reading a set parameter, which is for example stored in a memory. In other words, more generally it is indifferent whether the second object 4 comprises or not the second movement sensor 6 in so far as $\vec{g}_r$ represents the determined terrestrial gravity vector corresponding to the second datum $g_2$.

As mentioned above, and the first and second movement sensors 5, 6 may be accelerometers. In this case, the aforementioned predetermined threshold may take into account all or some of the following elements: a resolution and a noise of each of the accelerometers; accelerations specific to each of the accelerometers; a bias of each of the accelerometers; sensitivity defects of each of the accelerometers and their thermal drifts; an orientation error of each of the accelerometers with respect to the magnetic locating device. In other words, the aforementioned predetermined threshold may take into account various phenomena capable of inducing a difference in the measurements of accelerometers placed on two different objects, and that would cause the transposed first datum and the second datum to not be perfectly identical even without the presence of anomalies, or more generally that would cause the first and second data, placed in the common coordinate system, to not be perfectly identical even without the presence of anomalies.

The resolution of the accelerometer and its noise are factors that are possibly critical to the capacity of the system to detect artefacts. Indeed, in the static case, the noise $\vec{b}$ induces an angular error a that may be as larae as:

$$\alpha = \mathrm{atan}\left(\frac{\|\vec{b}\|}{\|\vec{g}\|}\right)$$

where a is the angular error for a measurement noise $\vec{b}$, and $\vec{g}$ represents the terrestrial gravity vector measured by said accelerometer. In the case where an accelerometer is associated with the first object comprising the magnetic emitter, and another accelerometer is associated with the second object comprising the magnetic receiver, this error due to resolution and noise is multiplied by two. This angular error sets the detection limit of the system. The noise may be decreased via low-pass filtering of the data of the accelerometers, as shown in FIG. 3. It is necessary to apply the same filtering to the data of the accelerometers of the first and second objects. In particular, the data are filtered after having been transposed to the same coordinate system (that of the emitter or that of the receiver), thus the same filter is used, thereby avoiding inducing additional errors.

Regarding taking into account specific accelerations, it will be noted that, apart from the terrestrial gravity vector g, the accelerometer also measures the specific accelerations due to the movement of the object (specific accelerations denoted "$\vec{a}$"). This acceleration biases the estimation of the angle and adds to the errors induced by the noise to give a maximum error of:

$$\alpha = \mathrm{atan}\left(\frac{\|\vec{a}\| + \|\vec{b}\|}{\|\vec{g}\|}\right).$$

This equation, i.e. the one just above, takes into account both acceleration $\vec{a}$ and noise $\vec{b}$. Since the spectrum of the specific accelerations are mainly confined to high frequencies, low-pass filtering is carried out in order to attenuate their effects. As for the attenuation of the noise specific to the accelerometers, it is necessary to apply this filtering identically to the data of the accelerometers of the first and second objects. In particular, the data are filtered after having been transposed to the same coordinate system (that of the emitter or that of the receiver), thus the same filter is used, thereby avoiding inducing additional errors.

For its part, bias creates an error that varies depending on orientation. It is maximal when the offset is perpendicular to the terrestrial gravity vector $\vec{g}$. The relationship between the error in the angle and the amplitude of the offset is:

$$\alpha = \mathrm{atan}\left(\frac{\|\overrightarrow{\mathrm{Off}}\|}{\|\vec{g}\|}\right)$$

where "$\overrightarrow{\mathrm{Off}}$" is the bias vector at the level of the accelerometer. It is necessary for the offset of the movement sensor to remain stable throughout the period of execution of the operation. In general, it is possible to carry out a calibration procedure in order to decrease the value of this bias.

The orientation error of the accelerometers with respect to the electromagnetic system may also be controlled. It may be guaranteed by construction or by way of a calibration method. The maximum orientation error is $\varepsilon_{max}$. The quantifying value of the maximum error depends on the structure of the system in question, like on the quality of the mechanical assembly of this system and of the accelerometers themselves. This error may, by calibration, be decreased below one degree.

It results from what has been said above that the predetermined threshold may in fact correspond to an angular value $\theta_{min}$ $$\theta_{min} = 2\left(\mathrm{atan}\left(\frac{\|\vec{a}\| + \|\vec{b}\| + \|\overrightarrow{\mathrm{Off}}\|}{\|\vec{g}\|}\right) + \varepsilon_{max}\right)$$

If the angle measured between the measurements of the two accelerometers placed in the same coordinate system exceeds this threshold, the presence of an artefact perturbing the electromagnetic device or a problem with the calibration of the magnetic locating device is detected.

The drift in the calibration parameters of the accelerometers with respect to temperature (the aforementioned sensitivity defects) may also be taken into account since it adds an additional error to the measurements of the accelerometers. What is disadvantageous here is above all a nonuniform variation in the sensitivity values of the three axes of the sensor (accelerometer), which axes are denoted x, y, z and for example form an orthogonal coordinate system. If the temperature variation modifies the three axes in exactly the same way, this has absolutely no disadvantageous effect on the estimation of angle, in contrast, if for example the x axis is affected more than the y axis, this naturally creates angular errors that will require the detection threshold to be increased. Indeed, if the gain of each axis of the sensor ($S_x$, $S_y$ and $S_z$ being the gains of the x, y and z axes of the accelerometer, respectively) is different from the others, a rotation of the terrestrial gravity vector is created. In this respect, there will be an angle $\alpha_s$ that will vary as a function of temperature and to calculate the threshold, it will be sought to maximise this angle to $\alpha_{s\ MAX}$. The maximum may be achieved if the true terrestrial gravity vector g is at 45° between the axes (the projection of this vector onto the xy, xz or yz plane is at 45° to the axes, xyz, representing the measurement coordinate system of the sensor). In the two-dimensional case (in the xy plane), the angular error is given by:

$$\alpha_{s\ MAX} = \left\| \operatorname{atan}\left(\frac{S_x}{S_y}\right) - 45° \right\|$$

Here, if $S_x=S_y$, the error will be zero (a tan(1)=45°), but if the sensitivities in x and in y are different, an error appears. Therefore, in the three-dimensional case, taking into account all the sensitivities, we will have:

$$\alpha_{s\ MAX} = \left\| \operatorname{atan}\left(\frac{S_x}{S_y}\right) + \operatorname{atan}\left(\frac{S_x}{S_z}\right) + \operatorname{atan}\left(\frac{S_y}{S_z}\right) - 135° \right\|$$

Taking into account what was described above, it is possible to evaluate the predetermined threshold $\theta_{min}$ to be:

$$\theta_{min} = 2\left( \operatorname{atan}\left(\frac{\|\vec{a}\| + \|\vec{b}\| + \|\overrightarrow{Off}\|}{\|\vec{g}\|}\right) + \varepsilon_{max} + \alpha_{s\ MAX} \right)$$

To summarize, either a compensation of the drift is added (a number of accelerometers are able to do this), or the threshold is increased to take into account the maximum possible variation that can be reached as described above. For example, if the ratio between $S_x$ and $S_y$ is 1% (an average accelerometer), a maximum error due to sensitivity defects of about 0.287° is obtained. In the case where all the ratios are 1% there will be a maximum error due to the sensitivity defects of about 0.8637°. If the error is 0.1% (a good well-calibrated accelerometer) the maximum error will be about 0.086°. It will be noted that, to determine the predetermined threshold angle, maximum errors are taken into account in order not to fall in to the case of false positives.

The predetermined threshold has been described above on the basis of the use of two accelerometers. Of course, the predetermined threshold may also be used if a single movement sensor is used.

Regarding the management of the specific accelerations, it was described above how to take them into account and to filter them out. To limit the residual effects of the specific accelerations, it is possible to activate the detection of an anomaly, notably when the latter is an artefact, only when the movement of the movable first object, and where appropriate of all the movable objects of the system equipped with accelerometers, is smaller than a threshold movement. It is thus possible to define, for each movable object, a threshold $\varepsilon$ beyond which the anomaly detection is inhibited. If $\|\vec{g}\|$ is the norm of the gravitational field measured by one of the accelerometers, $\vec{g}_0$ is the value of the gravitational field, the valid detection range for each movable object is then as follows:

$$\|\vec{g}_0\| - \varepsilon < \|\vec{g}\| < \|\vec{g}_0\| + \varepsilon$$

In other words, the first movement sensor 5 being an accelerometer, an acceleration is determined from the first movement sensor 5 and if this acceleration exceeds a maximum acceleration threshold, said indicator of presence of anomaly is considered to be erroneous.

The invention also relates to a method for using a system comprising the magnetic locating device equipped with the first magnetic element 1 and with the second magnetic element 2 that are associated with the first object 3 and with the second object 4 of said system, respectively. The first object 3 then comprises the first movement sensor 5 able to determine, for example by measurement, the first datum $g_1$ dependent on the inclination of the first object 3 in the basic reference frame, notably the terrestrial reference frame. This using method comprises a step of implementing the anomaly-detecting method such as described above. Thus, all that was described above with respect to the anomaly-detecting method may be applied in the context of the method for using the system.

According to one implementation of the method for using the system, when the first movement sensor 5 measures an acceleration higher than a maximum acceleration threshold, the step of implementing the anomaly-detecting method is inhibited. This allows the method to be implemented in a quasi-static case defined as a case in which the movement sensors (first and/or second movement sensor) are able to determine/measure the first datum, notably the terrestrial gravity vector. Indeed, in case of accelerations that are too high, it will be difficult to determine a value for the terrestrial gravity vector from a tri-axis accelerometer. In other words, the maximum acceleration threshold corresponds to a threshold beyond which the determination of the first datum with the first movement sensor 5 is impossible.

The invention also relates to a system comprising the magnetic locating device equipped with the first magnetic element 1 and with the second magnetic element 2. The first object 3 comprises the first magnetic element 1, and the second object 4 comprises the second magnetic element 2. Furthermore, the first object 3 comprises the movement sensor (the first sensor) able to determine/measure the first datum dependent on the inclination of the first object in the basic reference frame, notably the terrestrial reference frame. In particular, the system comprises a module configured to implement the steps of the anomaly-detecting method. This module may comprise software and hardware means for implementing said anomaly-detecting method.

Thus, it will be clear that the system may comprise all the hardware means used in the context of the method, and elements configured to implement the various steps of the anomaly-detecting method. In this respect, the second object may comprise the second movement sensor 6, etc.

In a way applicable to everything that has been said above, the first element 1 and the first movement sensor 5 move as one, i.e. any movement and any modification of orientation applied to one is also applied to the other; the first movement sensor 5 and the first element 1 are thus said to be fixed with respect to the first object 3 that comprises them. The same goes for the second object 4, the second magnetic element 2 and where appropriate the second movement sensor 6.

While allowing an angle, notably between the transposed first datum and the second datum, to be determined, the error is quantifiable (expressed in degrees) and provides information on the estimation precision directly, contrary to the prior-art measurements in microtesla using only the magnetic locating device, which does not give the direct link with the precision.

Moreover, the detection of an anomaly-type artefact is rapid and allows a theoretical resolution in the vicinity of 0.5° to be achieved.

As mentioned above, the detection of an anomaly may also correspond to a detection of failures internal to the magnetic locating device (poorly calibrated magnetic locating device, uncompensated mutual induction, etc.).

Moreover, the use of one or more movement sensors makes it possible to rely on a technology that is independent of the magnetic modality, allowing the reliability of the magnetic locator to be increased in use.

The present invention is most particularly applicable to the medical field. In such a field, magnetic locating devices may be used to locate a surgical tool and must guarantee a large submillimeter precision. In contrast, since this kind of locating device is very sensitive to electromagnetic perturbations, the detection of an anomaly is essential to avoid problems related to the location.

Generally, during the use of the locating device, notably in the course of the method for using the system, the first object is movable. In other words, the step of implementing the anomaly-detecting method may be implemented at various times, for example at regular intervals. These steps E1, E2, E3, E4 and where appropriate E5 are notably implemented at a corresponding time and are representative of an image of the current configuration of the system at said time.

Moreover, the present invention furthermore allows only one magnetic receiver to be employed within the magnetic locating device (for example formed by the first magnetic element or the second magnetic element) while allowing an anomaly to be detected using the one or more movement sensors. Magnetic receivers are often of larger size and more expensive than movement sensors, and a saving in space and cost therefore results. The one or more added movement sensors are of size allowing them to be added without modifying the size of the locating device.

In the present description by "relative orientation" or "relative location" between two elements (for example a magnetic-field emitter and a magnetic-field receiver), what is meant is that this relative orientation—or this relative location—may be that of one of these two elements with respect to the other of these two elements.

The invention claimed is:

1. A method for detecting an anomaly associated with a magnetic locating system, the magnetic locating system including a first object including a first magnetic element and a second object including a second magnetic element, wherein the first object further includes a first movement sensor configured to determine a first datum indicating an inclination of the first object in a base reference frame, or a terrestrial reference frame, the method comprising:

determining the first datum indicating the inclination of the first object from the first movement sensor;

determining a second datum indicating an inclination of the second object in the base reference frame;

determining an orientation parameter indicating a relative orientation of the first and second magnetic elements; and generating an indicator of a presence of the anomaly, using the orientation parameter, the first datum, and the second datum.

2. The method according to claim 1, wherein the generating step further comprises:

transposing the first datum, acquired in a coordinate system attached to the first object, to a coordinate system attached to the second object using the orientation parameter; and generating the indicator of the presence of the anomaly from a comparison of the transposed first datum and the second datum, or:

transposing the second datum, acquired in the coordinate system attached to the second object, to the coordinate system of the first object using the orientation parameter, and generating the indicator of the presence of the anomaly from a comparison of the transposed second datum and the first datum.

3. The method according to claim 2, wherein the first datum and the second datum represent terrestrial gravity vectors, and the step of generating the indicator of the presence of the anomaly is an angle between the transposed first datum and the second datum or between the first datum and the transposed second datum.

4. The method according to claim 1, wherein the orientation parameter is one of an orientation quaternion between the second object and the first object, determined by the magnetic locating system, a rotation matrix allowing passage from an orientation of the first object to the second object and vice versa, and Euler or Cardan angles.

5. The method according to claim 1, wherein the second object comprises a second movement sensor configured to determine the second datum.

6. The method according to claim 5, wherein the first magnetic element is a magnetic-field emitter, the second magnetic element is a magnetic-field receiver, and the indicator of the presence of the anomaly is an angle 9 such that:

$$\theta = \operatorname{acos}\left(\frac{(q_{e \to r} * \vec{g}_r q_{e \to r}) \cdot \vec{g}_e}{\|\vec{g}_e\| \|\vec{g}_r\|}\right)$$

wherein $q_{e \to r}$ is the quaternion describing the orientation of the second object with respect to the first object, the quaternion being determined by the magnetic locating system from data measured by the magnetic-field receiver, $\vec{g}_e$ is a terrestrial gravity vector determined by the first movement sensor, $\vec{g}_r$ is a terrestrial gravity vector determined by the second movement sensor, $q_{e \to r}*$ is the conjugated value of the quaternion $q_{e \to r}$, and the operator • is the scalar product.

7. The method according to claim 5, wherein the first and second movement sensors are accelerometers.

8. The method according to claim 7, wherein the predetermined threshold takes into account at least one of
a resolution and a noise of each of the accelerometers,
accelerations specific to each of the accelerometers,
a bias of each of the accelerometers,
sensitivity defects of each of the accelerometers and their thermal drifts, and
an orientation error of each of the accelerometers with respect to the magnetic locating system.

9. The method according to claim 1, wherein the first magnetic element is a magnetic-field emitter, the second magnetic element is a magnetic-field receiver, and the indicator of presence of the anomaly is an angle θ such that:

$$\theta = \mathrm{acos}\left(\frac{(q_{e \to r} * \vec{g}_r q_{e \to r}) \cdot \vec{g}_e}{\|\vec{g}_e\| \|\vec{g}_r\|}\right)$$

wherein $q_{e \to r}$ is the quaternion describing the orientation of the second object with respect to the first object, the quaternion being determined by the magnetic locating system from data measured by the magnetic-field receiver, $\vec{g}_e$ is a terrestrial gravity vector determined by the first movement sensor, $\vec{g}_r$ is a terrestrial gravity vector corresponding to the second datum, $q_{e \to r}*$ is the conjugated value of the quaternion $q_{e \to r}$, and the operator • is the scalar product.

10. The method according to claim 1, further comprising comparing the generated indicator of the presence of the anomaly with a predetermined threshold.

11. The method as claimed in claim 1, wherein the first magnetic element of the first object is a magnetic-field emitter, and the second magnetic element of the second object is a magnetic-field receiver.

12. The method according to claim 1, wherein the first movement sensor is an accelerometer, an acceleration is determined from the first movement sensor, and when the determined acceleration exceeds a maximum acceleration threshold, the indicator of the presence of anomaly is determined to be erroneous.

13. A method, comprising:
only when determining that a measured acceleration is not higher than a maximum acceleration threshold, performing the method of claim 1, the measured acceleration being measured by the first movement sensor.

14. A system, comprising:
a first object comprising a first magnetic element, the first object including a movement sensor to determine a first datum indicating an inclination of the first object in a base reference frame;
a second object comprising a second magnetic element; and
processing circuitry configured to
determine the first datum indicating the inclination of the first object from the first movement sensor;
determine a second datum indicating an inclination of the second object in the base reference frame;
determine an orientation parameter indicating a relative orientation of the first and second magnetic elements; and
generate an indicator of a presence of an anomaly using the orientation parameter, the first datum, and the second datum.

15. A method for detecting an anomaly associated with a magnetic locating system, the magnetic locating system including a first object including a first magnetic element and a second object including a second magnetic element, wherein the first object further includes a first movement sensor configured to determine a first datum indicating an inclination of the first object in a base reference frame, or a terrestrial reference frame, the method comprising:
determining the first datum indicating the inclination of the first object from the first movement sensor;
determining a second datum indicating an inclination of the second object in the base reference frame;
determining an orientation parameter indicating a relative orientation of the first and second magnetic elements; and
generating an indicator of a presence of the anomaly using the orientation parameter, the first datum, and the second datum, wherein the generating step further comprises
transposing the first datum, acquired in a coordinate system attached to the first object, to a coordinate system attached to the second object using the orientation parameter; and
generating the indicator of the presence of the anomaly from a comparison of the transposed first datum and the second datum.

* * * * *

UNITED STATES PATENT AND TRADEMARK OFFICE
CERTIFICATE OF CORRECTION

PATENT NO. : 10,830,917 B2
APPLICATION NO. : 16/083435
DATED : November 10, 2020
INVENTOR(S) : Saifeddine Aloui et al.

It is certified that error appears in the above-identified patent and that said Letters Patent is hereby corrected as shown below:

In the Claims

In Column 18, Claim 4, Line 34, delete "of" and insert -- of: --, therefor.

In Column 18, Claim 6, Line 48, delete "9" and insert -- θ --, therefor.

In Column 19, Claim 8, Line 2, delete "of" and insert -- of: --, therefor.

In Column 20, Claim 14, Line 8, delete "to" and insert -- to: --, therefor.

In Column 20, Claim 15, Line 38, delete "comprises" and insert -- comprises: --, therefor.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*